3,225,072
CARBALKOXYHYDRAZONES OF THE
ANDROSTANE SERIES
Romano Deghenghi, Westmount, Quebec, Canada, assignor to American Home Products Corporation, New York, N.Y., a corporation of Delaware
No Drawing. Filed July 28, 1964, Ser. No. 385,773
8 Claims. (Cl. 260—397.5)

The present invention relates to novel steroidal compounds. More particularly the present invention relates to androstane derivatives.

The novel compounds of the present invention, which are potent anabolic agents with low androgenicity, are represented by the following formula:

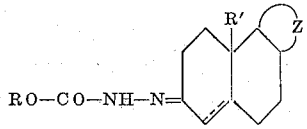

in which R is selected from the group which consists of lower alkyl groups containing from 1 to 3 carbon atoms; R' is selected from the group which consists of hydrogen and methyl; and Z represents the C and D rings of the usual steroid nucleus, together with their respective substituents.

The novel compounds of the present invention are prepared by reacting a carbalkoxyhydrazine with the appropriate steroidal 3-ketone in a suitable solvent and isolating the desired 3-carbalkoxyhydrazone. A suitable solvent is glacial acetic acid, and the reaction is advantageously carried out for several hours at room temperature.

A singular feature of this invention is the presence of unexpected and surprising biological properties in the novel compounds, which possess highly favorable anabolic to androgenic ratios generally superior to those of their respective starting materials.

Anabolic agents are useful in speeding recovery after operations, in promoting nitrogen retention and the building of protein reserves, in the treatment of muscular weakness, and in combating poor appetite, cachexia or osteoporosis. They may be administered by subcutaneous or intramuscular injection, or they may be given orally. Such anabolic agents, moreover, are useful in both animals and human beings for increasing body weight.

The compounds of my invention exhibit excellent separation of anabolic from androgenic activities as measured by the ratio of weights of the levator ani to ventral prostate, having ratios greater than unity. Some presently available anabolic drugs, used in medicine, are characterized by a ratio of levator ani weight to ventral prostate weight of less than one-half, thus indicating the great superiority of the compounds of this invention.

The following examples serve to illustrate but are not intended to limit the scope of the invention.

Example 1

To a quantity of methyltestosterone (3.0 g.) in 50 ml. glacial acetic acid there was added 3.0 g. of carbethoxyhydrazine, $C_2H_5O.CO.NH.NH_2$. The mixture was kept at room temperature for 16 hours then poured into ice-water and the product collected on a filter. Crystallization from methylene chloride-hexane mixture afforded 17α-methyl-4-androsten-17β-ol-3-carbethoxyhydrazone, M.P. 168–170°.

Example 2

To a quantity of 17α-ethyl-19-nor-18-methyl-4-androsten-17β-ol-3-one (200 mg.) in 5 ml. acetic acid there was added 200 mg. of carbethoxyhydrazine and the mixture kept at room temperature for 22 hours. Working up as in Example 1 provided 17α-ethyl-19-nor-18-methyl-4-androsten-17β-ol-3-carbethoxyhydrazone as a solid compound, melting at 206–208° C.

Example 3

To 1.0 g. of 17α-methyl-9α-fluoro-4-androsten-11β,17β-diol-3-one dissolved in methylene chloride (15 ml.) and acetic acid (20 ml.) there was added 1.0 g. of carbethoxyhydrazine. Working up as in the previous examples, followed by chromatographic purification on silica, afforded the product, 17α-methyl-9α-fluoro-4-androsten-11β,17β-diol-3-carbethoxyhydrazone.

When carbomethoxyhydrazine, $CH_3O.CO.NH.NH_2$, was substituted for carbethoxyhydrazine, the corresponding 3-carbomethoxyhydrazone was obtained.

Example 4

The following starting materials were treated with the indicated hydrazine derivative according to the previously described procedures, thus furnishing the corresponding products hereinafter set forth:

| Starting Compounds | Hydrazine Derivative RO—CO—NH—NH₂ | Products |
|---|---|---|
| 17β-hydroxy-5α-androstan-3-one | R=CH₃— | 17β-hydroxy-5α-androstan-3-carbomethoxydrazone. |
| Do | R=C₂H₅— | 17β-hydroxy-5α-androstan-3-carbethoxyhydrazone. |
| Do | R=C₃H₇— | 17β-hydroxy-5α-androstan-3-carbopropoxyhydrazone. |
| 2α-methyl-17β-propionoxy-5α-androstan-3-one. | R=C₂H₅— | 2α-methyl-17β-propionoxy-5α-androstan-3-carbethoxyhydrazone. |
| 1-methyl-17β-acetoxy-5α-androst-1-en-3-one. | R=C₂H₅— | 1-methyl-17β-acetoxy-5α-androst-1-ene-3-carbethoxyhydrazone. |
| 17α-ethyl-19-nortestosterone | R=CH₃— | 17α-ethyl-17β-hydroxy-19-nor-4-androstene-3-carbomethoxyhydrazone. |
| 4-chloro-testosterone acetate | R=C₂H₅— | 4-chloro-17β-acetoxy-4-androstene-3-carbethoxyhydrazone. |
| 17α-methyl-4-hydroxy-testosterone | R=C₂H₅— | 17α-methyl-4-hydroxy-4-androsten-17β-ol-3-carbethoxyhydrazone. |
| Testosterone propionate | R=CH₃— | 17β-propionoxy-4-androsten-3-carbomethoxyhydrazone. |
| Do | R=C₂H₅— | 17β-propionoxy-4-androsten-3-carbethoxyhydrazone. |
| 19-nortestosterone | R=C₃H₇— | 17β-hydroxy-19-nor-4-androstene-3-carbopropoxyhydrazone. |

I claim:
1. A steroid compound of the formula:

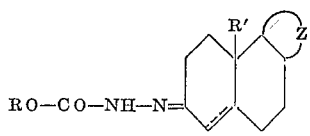

in which R is selected from the group consisting of lower alkyl groups containing from 1 to 3 carbon atoms; R' is selected from the group consisting of hydrogen and methyl; and Z represents the C and D rings of the usual steroid nucleus, together with their respective substituents, said steroid compound being selected from the group consisting of 17α-methyl-4-androsten-17β-ol-3-carbethoxyhydrazone,
17α - ethyl-19-nor-18-methyl-4-androsten-17β-ol-3-carbethoxyhydrazone,
17α-methyl-9α-fluoro-4-androsten-11β,17β-diol-3-carbethoxyhydrazone,
17α - methyl-9α-fluoro-4-androsten-11β,17β-diol-3-carbomethoxyhydrazone,
17β-hydroxy-5α-androsten-3-carbomethoxyhydrazone,
17β-hydroxy-5α-androstan-3-carbethoxyhydrazone,
17β-hydroxy-5α-androstan-3-carbopropoxyhydrazone,
2α - methyl-17β-propionoxy-5α-androstan-3-carbethoxyhydrazone,
1 - methyl-17β-acetoxy-5α-androst-1-ene-3-carbethoxyhydrazone,
17α - ethyl-17β-hydroxy-19-nor-4-androstene-3-carbomethoxyhydrazone,
4 - chloro - 17β-acetoxy-4-androstene-3-carbethoxyhydrazone,
17α - methyl-4-hydroxy-4-androsten-17β-ol-3-carbethoxyhydrazone,
17β-propionoxy-4-androsten-3-carbomethoxyhydrazone,
17β-propionoxy-4-androsten-3-carbethoxyhydrazone, and
17β - hydroxy-19-nor-4-androstene-3-carbopropoxyhydrazone.

2. 17α - methyl - 4 - androsten - 17β - ol - 3 - carbethoxyhydrazone.
3. 17α - ethyl - 19 - nor - 18 - methyl - 4 - androsten-17β-ol-3-carbethoxyhydrazone.
4. 17α - methyl - 9α - fluoro - 4 - androsten - 11β,17β-diol-3-carbethoxyhydrazone.
5. 17α - methyl - 9α - fluoro - 4 - androsten - 11β,17β-diol-3-carbomethoxyhydrazone.
6. 17α - ethyl - 17β - hydroxy - 19 - nor - 4 - androstene-3-carbomethoxyhydrazone.
7. 17β - propionoxy - 4 - androstene - 3 - carbomethoxyhydrazone.
8. 17β - hydroxy - 19 - nor - 4 - androstene - 3 - carbopropoxyhydrazone.

References Cited by the Examiner
UNITED STATES PATENTS
3,169,979  2/1965  De Stevens _____ 260—397.5

LEWIS GOTTS, *Primary Examiner.*

UNITED STATES PATENT OFFICE
CERTIFICATE OF CORRECTION

Patent No. 3,225,072                                     December 21, 1965

Romano Deghenghi

It is hereby certified that error appears in the above numbered patent requiring correction and that the said Letters Patent should read as corrected below.

Column 3, line 24, for "17β-hydroxy-5α-androsten-3-carbomethoxyhydrazone" read -- 17β-hydroxy-5α-androstan-3-carbomethoxyhydrazone --.

Signed and sealed this 28th day of June 1966.

(SEAL)
Attest:

ERNEST W. SWIDER                                                EDWARD J. BRENNER
Attesting Officer                                                      Commissioner of Patents